United States Patent
Ramb

(10) Patent No.: US 9,039,353 B2
(45) Date of Patent: May 26, 2015

(54) TURBOCHARGER TURBINE

(75) Inventor: Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 691 days.

(21) Appl. No.: 13/379,412

(22) PCT Filed: Jun. 29, 2010

(86) PCT No.: PCT/US2010/040291
§ 371 (c)(1),
(2), (4) Date: Dec. 20, 2011

(87) PCT Pub. No.: WO2011/002732
PCT Pub. Date: Jan. 6, 2011

(65) Prior Publication Data
US 2012/0099965 A1    Apr. 26, 2012

(30) Foreign Application Priority Data

Jul. 2, 2009   (DE) .................. 10 2009 031 485

(51) Int. Cl.
*F01D 17/00*  (2006.01)
*F02B 37/18*  (2006.01)
*F02C 6/12*  (2006.01)
(Continued)

(52) U.S. Cl.
CPC .............. *F02C 6/12* (2013.01); *F01D 17/141* (2013.01); *F01D 17/105* (2013.01); *F02B 37/18* (2013.01); *F05D 2220/40* (2013.01)

(58) Field of Classification Search
CPC ..... F01D 17/141; F01D 17/143; F01D 17/16; F01D 17/167
USPC ......... 415/126, 127, 128, 144, 145, 157, 158, 415/167
See application file for complete search history.

(56) References Cited

U.S. PATENT DOCUMENTS

| | | | | |
|---|---|---|---|---|
| 4,586,336 | A | * | 5/1986 | Horler .............................. 60/602 |
| 5,758,500 | A | * | 6/1998 | Sumser et al. .................. 60/602 |
| 5,855,117 | A | * | 1/1999 | Sumser et al. .................. 60/602 |

(Continued)

FOREIGN PATENT DOCUMENTS

| DE | 4204019 A1 | * | 5/1993 |
|---|---|---|---|
| DE | 10328167 A1 | * | 1/2005 |

(Continued)

OTHER PUBLICATIONS

Machine translation of DE 10328167 A1 from EPO on Aug. 20, 2014.*

*Primary Examiner* — Edward Look
*Assistant Examiner* — Christopher R Legendre
(74) *Attorney, Agent, or Firm* — A. Michael Tucker; Stephan A. Pendorf; Patent Central LLC

(57) ABSTRACT

A turbocharger turbine which has a wastegate slide sleeve (8), which is provided in a wastegate arrangement (5) and which closes off the wastegate duct, as a shut-off element. The wastegate arrangement (5) comprises a bypass duct (6) which runs in the turbine housing (2); a wastegate duct (7) which runs in the turbine housing (2) to the turbine housing outlet (4) and which is connected via the bypass duct (6) to the turbine housing inlet (3); and a shut-off element (8) which is arranged in the turbine housing (2). The shut-off element (8) is provided to open and close the wastegate duct (7) and can be moved by means of an actuating device (9) into an open position and closed position.

14 Claims, 3 Drawing Sheets

(51) Int. Cl.
*F01D 17/14* (2006.01)
*F01D 17/10* (2006.01)

(56) References Cited

U.S. PATENT DOCUMENTS

| | | | |
|---|---|---|---|
| 5,943,864 A * | 8/1999 | Sumser et al. | 60/602 |
| 6,202,413 B1 * | 3/2001 | Baker et al. | 60/602 |
| 6,269,643 B1 * | 8/2001 | Schmidt et al. | 60/602 |
| 6,443,696 B1 * | 9/2002 | Erdmann et al. | 415/157 |
| 6,478,536 B2 * | 11/2002 | Doring et al. | 415/158 |
| 6,715,288 B1 * | 4/2004 | Engels et al. | 60/602 |
| 7,162,872 B2 * | 1/2007 | Schmid et al. | 60/602 |
| 8,047,772 B2 * | 11/2011 | Petitjean et al. | 415/158 |
| 8,191,368 B2 * | 6/2012 | Garrett et al. | 60/602 |
| 8,209,982 B2 * | 7/2012 | Sumser et al. | 60/612 |
| 8,312,720 B2 * | 11/2012 | Kratschmer et al. | 60/605.2 |
| 8,621,863 B2 * | 1/2014 | Kratschrner et al. | 60/602 |
| 2012/0099965 A1 * | 4/2012 | Ramb | 415/145 |

FOREIGN PATENT DOCUMENTS

| | | |
|---|---|---|
| EP | 2067962 A2 * | 6/2009 |
| GB | 2264982 A * | 9/1993 |

* cited by examiner

TURBOCHARGER TURBINE

BACKGROUND OF THE INVENTION

1. Field of the Invention

The invention relates to a turbocharger turbine

2. Description of the Related Art

In supercharged internal combustion engines which use an exhaust-gas turbocharger, the latter is often provided with a wastegate. An exhaust-gas turbocharger having a wastegate is known from EP 1 256 703 B1.

In the present prior art, the regulation of a wastegate arrangement takes place by means of the regulating valve or regulating flap. The latter is actuated by means of a control capsule or another actuator, such as for example an electric actuator, and remains closed for as long as no bypass quantity is desired. To be able to further reduce the exhaust-gas back pressure with ever-increasing throughput, wastegate cross sections in particular in spark-ignition engines are becoming ever larger. As a result, the force with which the flap must be held closed also increases. There are thus often resulting installation space problems as a result of excessively large control capsules or with available electric actuators.

BRIEF SUMMARY OF THE INVENTION

It is therefore an object of the present invention to provide a turbine whose wastegate can be regulated and held closed in a reliable and simple manner even for large wastegate cross sections.

According to the invention, a shut-off element in the form of a wastegate slide is provided which can open and close the wastegate duct. The wastegate slide is provided with a suitable actuating device for this purpose.

According to the invention, the slide as a sleeve can be guided, at its inner or outer circumferential surface, by means of a bearing sleeve which is fixed in the turbine housing. In particular, the wastegate arrangement according to the invention can be used for all types of turbine housings (single-channel, multi-channel, double-flow) and can be produced at low cost and installed with a minimal spatial requirement.

BRIEF DESCRIPTION OF THE SEVERAL VIEWS OF THE DRAWINGS

Further details, advantages and features of the present invention will emerge from the following description of exemplary embodiments on the basis of the appended drawing, in which.

DETAILED DESCRIPTION OF THE INVENTION

Figure 1:
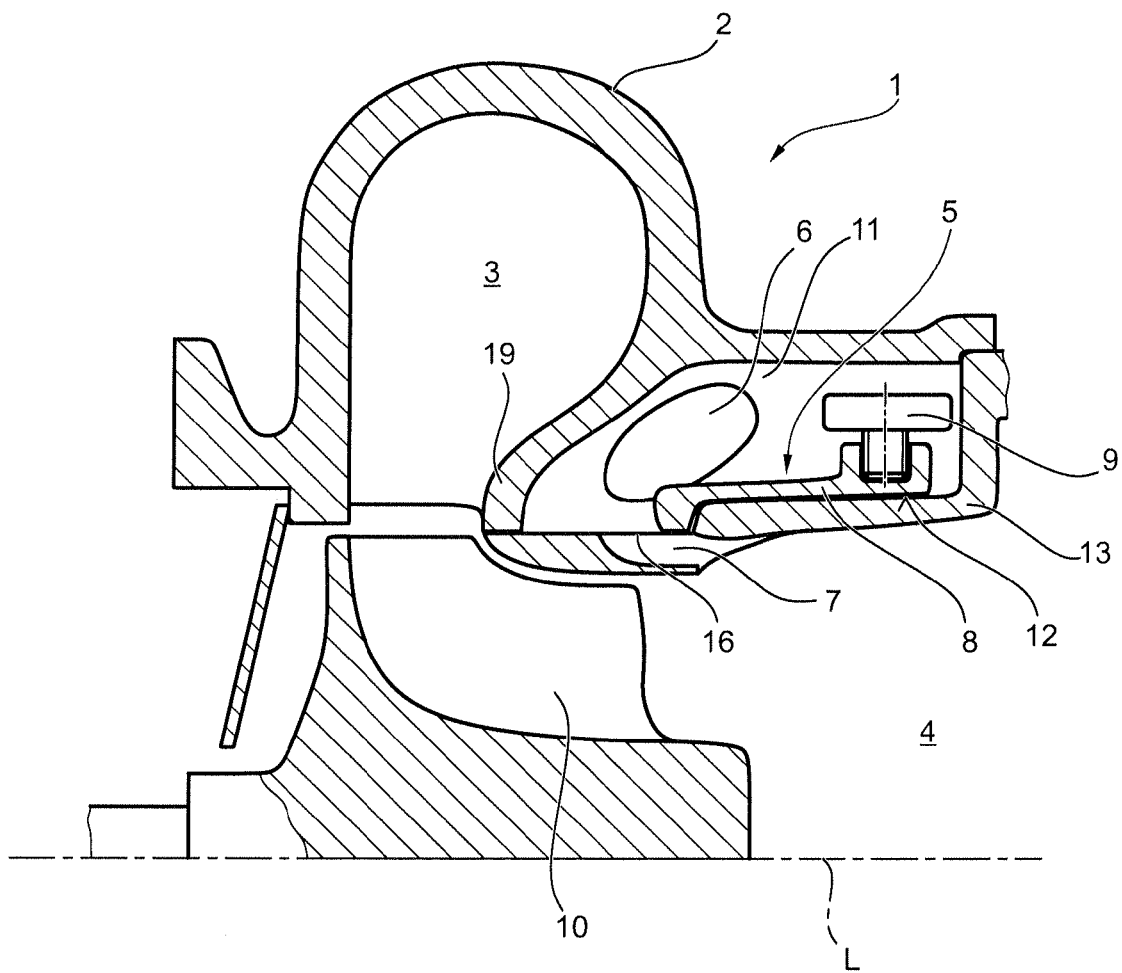
FIG. 1 shows a simplified sectional view of a first embodiment of the exhaust-gas turbocharger with a wastegate slide sleeve mounted at the inside.

The turbocharger turbine 1 illustrated in FIG. 1 has, according to a first embodiment, a turbine housing 2 and a wastegate arrangement 5. The turbine housing 2, in which a turbine wheel 10 is arranged so as to be rotatable about a turbine housing axis L, comprises a turbine housing inlet, a volute 3 and a turbine housing outlet 4.

The wastegate arrangement 5 comprises a bypass duct 6, which runs in the turbine housing 2, and a wastegate duct 7 which runs to the turbine housing outlet 4 and which is connected via the bypass duct 6 to the turbine housing inlet 3. Furthermore, the wastegate arrangement 5 comprises a shut-off element 8 which is arranged in the turbine housing 2 and which, in order to open and close the wastegate duct 7, can be moved by means of an actuating device 9 into an open position and closed position. Said shut-off element is designed as an axially movable annular wastegate slide sleeve 8.

The slide sleeve 8 is guided, at its inner surface 12 pointing toward the turbine housing axis L, by means of a bearing sleeve 13 which is fixed to the turbine housing 2.

The bearing housing 13 projects as far as the turbine housing wall 19 and has openings 16 which open out into a wastegate duct 7. In the closed position, the slide sleeve 8 does not generate any axial sealing action with the turbine housing wall 19, such that no high closing forces are required.

Targeted guidance of the bypass flow to the exhaust-gas flow emerging from the turbine wheel is obtained by means of the shaping of the wastegate duct 7. This results in good thermal mixing of the two flows. Furthermore, by means of corresponding selection of the duct cross-sectional areas, it is possible to obtain a pressure reduction at the turbine wheel outlet by means of high bypass flow speeds (ejector effect).

Figure 2:
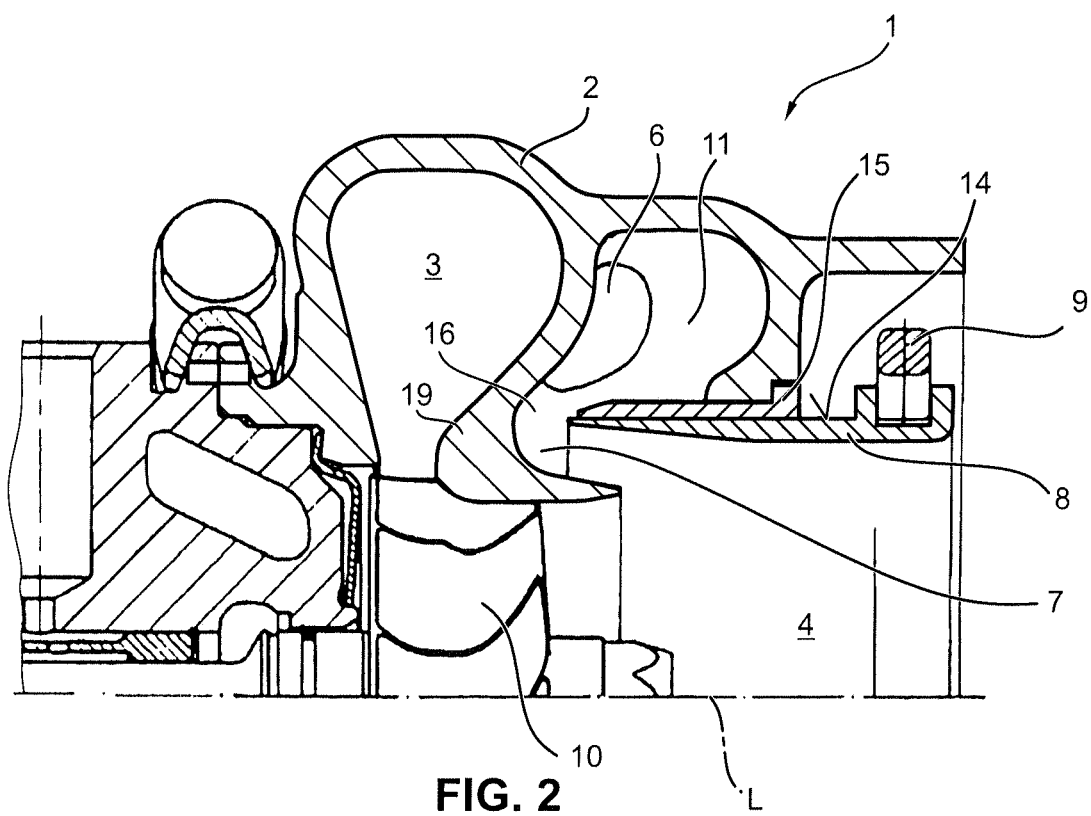
FIG. 2 shows a simplified sectional view of a second embodiment of the exhaust-gas turbocharger with a wastegate slide sleeve mounted at the outside.

In the second embodiment according to FIG. 2, in which all the features corresponding to FIG. 1 are provided with the same reference symbols, the slide sleeve 8 is guided, at its outer surface 14 facing away from the turbine housing axis L, via a sleeve bearing 15 which is fixed in the turbine housing 2. Here, the bearing sleeve 15 does not extend as far as the turbine housing wall 19. The remaining spacing corresponds to the opening 16, and the slide sleeve 8 seals off against the turbine housing wall 19 in the closed position. It is of course also possible for the the axis of the slide sleeve (8) to be inclined in relation to the turbine housing axis (L).

Figure 3:
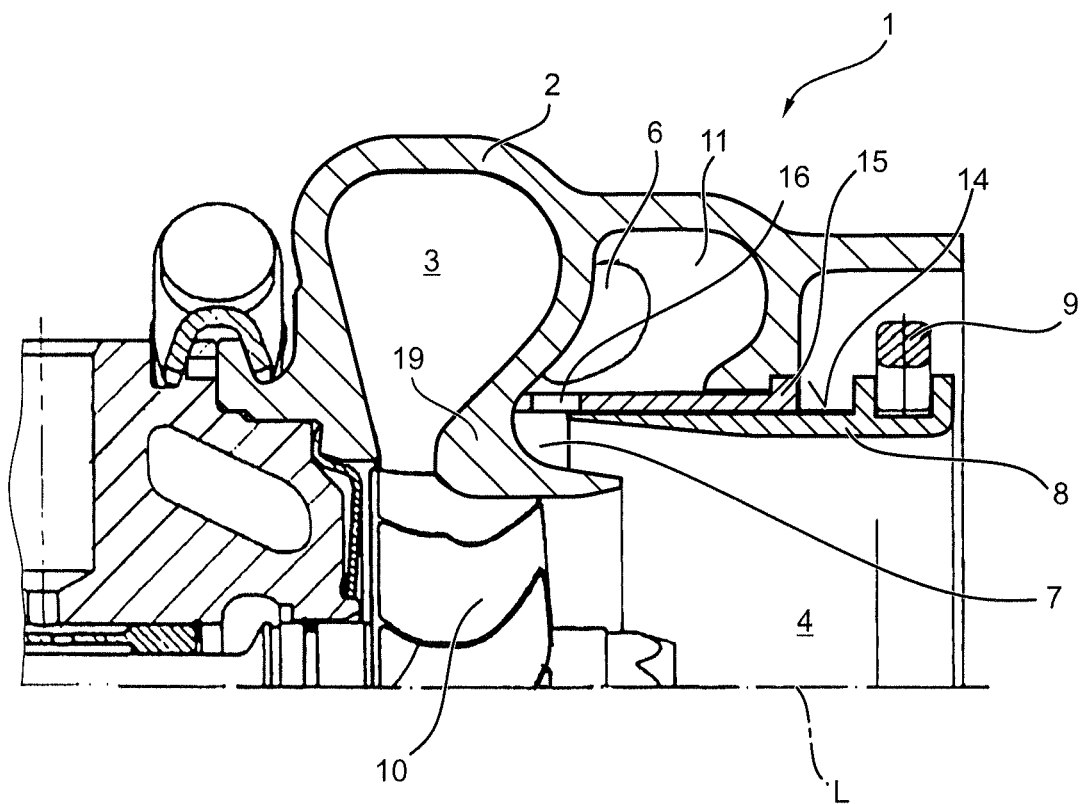
FIG. 3 shows a simplified sectional view of a wastegate slide sleeve which is guided in a bearing sleeve which extends as far as the turbine housing wall.

It can also be seen from FIG. 3 that, in said embodiment, the bearing sleeve 15 extends into the region of the turbine housing wall 19 and is provided with a least one opening 16 in the region of the wastegate duct 7. As a result of said opening 16, the axial slide pressing force for sealing against the turbine housing wall 19 by means of the bearing sleeve 15 can be eliminated. The axial force for moving the slide can accordingly be selected to be only so high that the slide opens and closes the opening 16 of the bearing sleeve 15, as in FIG. 1.

Figure 4:
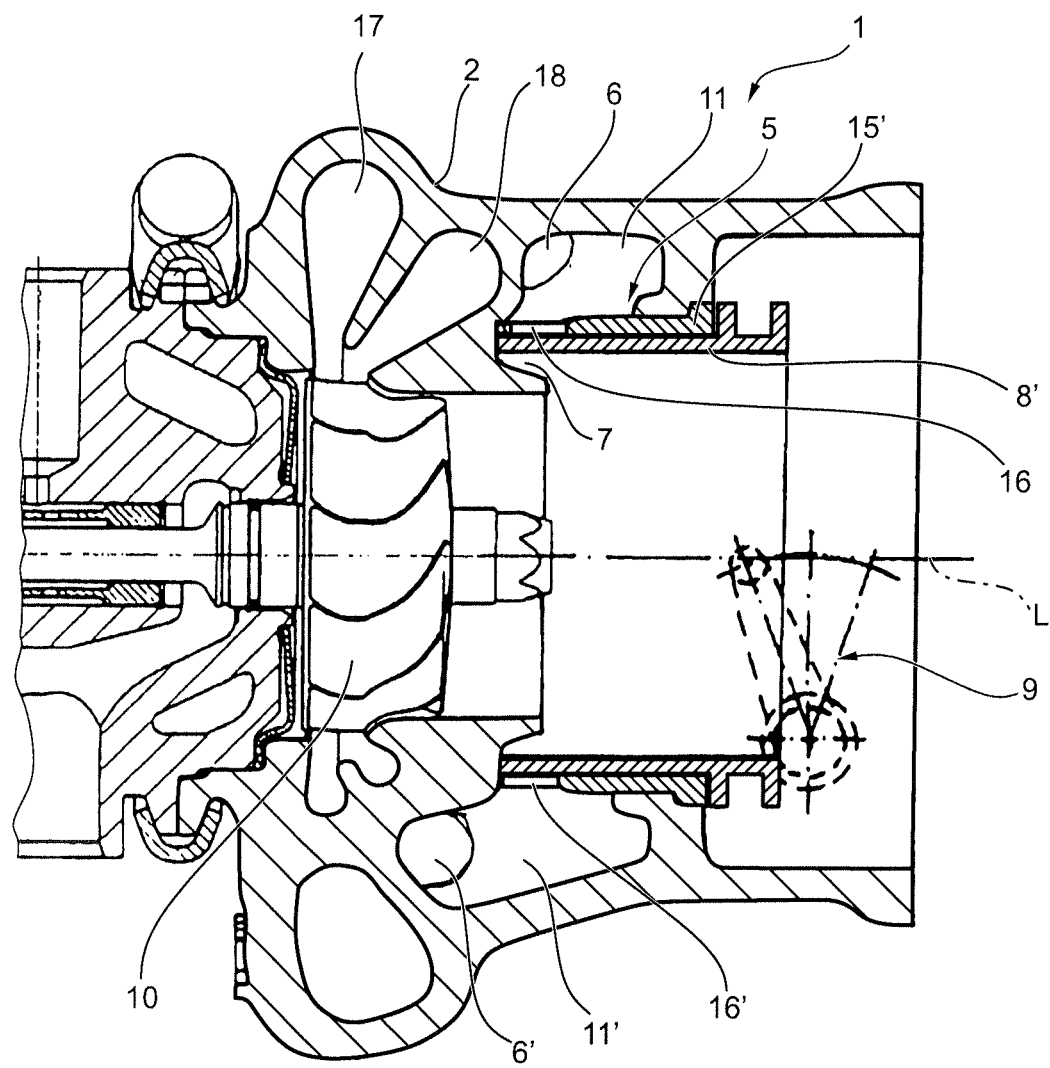
FIG. 4 shows a simplified sectional illustration of a two-channel exhaust-gas turbocharger with separate bypass guidance.

As illustrated in FIG. 4, the turbine housing 2 is provided in this embodiment with two volutes 17, 18 which are assigned in each case one bypass duct 6 and 6' and one annular chamber segment 11 and 11' of the annular chamber 11. Here, the turbine housing 2 may also have more than two volutes.

Openings 16 and 16' are provided in the bearing sleeve 15', which openings 16 and 16' are assigned to the annular chamber segments 11 and 11'.

Furthermore, the actuating device 9 may be designed as an actuating fork or as a lever which can be moved by means of a guide slot and groove arrangement.

To supplement the above disclosure, reference is made explicitly to the diagrammatic illustration of the invention in FIGS. 1 to 4.

List Of Reference Symbols
1 Turbocharger turbine
2 Turbine housing
3 Turbine housing inlet
4 Turbine housing outlet 5 Wastegate arrangement
6; 6' Bypass duct
7 Wastegate duct
8 Shut-off element
8 Slide sleeve
9 Actuating device
10 Turbine wheel
11; 11' Annular chamber or annular chamber segment
12 Inner surface
13, 15, 15' Bearing sleeve
14 Outer surface
16; 16' Opening
17, 18 Channels
19 Turbine housing wall
L Turbine housing axis

The invention claimed is:

1. A turbocharger turbine (1), having
a turbine housing (2) in which a turbine wheel (10) is arranged so as to be rotatable about a turbine housing axis (L), at least first and second turbine housing inlets, with one turbine housing inlet associated with each of at least two turbine volutes (17, 18), the turbine volutes shaped to direct exhaust flow from the associated turbine housing inlet onto the turbine wheel, a turbine wheel exhaust outlet, and a turbine housing outlet (4); and
a wastegate arrangement (5) which has:
at least first and second bypass ducts (6, 6'), wherein one bypass duct is associated with each of said turbine housing inlets,
an annular chamber (11) circumscribing the turbine housing axis (L), wherein each bypass duct bypasses the turbine volutes (17, 18) and runs from said turbine housing inlets upstream of the turbine volutes (17, 18) into a different segment of the annular chamber (11),
an annular wastegate duct (7) circumscribing the turbine housing axis (L) downstream of the turbine wheel exhaust outlet, into which the annular chamber opens,
a slide sleeve (8) which is arranged between the bypass ducts (6, 6') and wastegate duct (7), and which can be moved via an actuating device (9) into an open position allowing flow of exhaust gas through the bypass ducts (6, 6') and wastegate duct (7) and a closed position blocking flow of exhaust gas through the bypass ducts (6, 6') and wastegate duct (7).

2. A turbocharger turbine (1), having
a turbine housing (2) in which a turbine wheel (10) is arranged so as to be rotatable about a turbine housing axis (L), at least two turbine housing inlets, with one turbine housing inlet associated with each of at least two turbine volutes (17, 18), the turbine volutes shaped to direct exhaust flow from the associated turbine housing inlet onto the turbine wheel, a turbine wheel exhaust outlet, and a turbine housing outlet (4); and
a wastegate arrangement (5) which has:
at least first and second bypass ducts (6, 6'), each bypass duct associated with one turbine housing inlet, each bypass duct bypassing the turbine volutes (17, 18) and running from said turbine housing inlets upstream of the turbine volutes (17, 18) to a wastegate duct (7) which discharges into the turbine housing outlet (4) downstream of the turbine wheel exhaust outlet; and
a slide sleeve (8) which is arranged between the bypass ducts (6, 6') and wastegate duct (7), and which can be moved via an actuating device (9) into an open position allowing flow of exhaust gas through the bypass ducts (6, 6') and wastegate duct (7) and a closed position blocking flow of exhaust gas through the bypass ducts (6, 6') and wastegate duct (7).

3. The turbine as claimed in claim 2, wherein a sleeve bearing (15) is provided with openings (16; 16') assigned to the respective bypass ducts (6, 6').

4. A turbocharger turbine (1), having
a turbine housing (2) in which a turbine wheel (10) is arranged so as to be rotatable about a turbine housing axis (L), the turbine housing (2) having a turbine housing inlet, at least one turbine volute (3) designed to direct exhaust flow from the turbine housing inlet onto the turbine wheel, a turbine wheel exhaust outlet, and a turbine housing outlet (4); and
a wastegate arrangement (5) which has:
a bypass duct (6) which bypasses the at least one turbine volute and runs from the turbine housing inlet upstream of the at least one turbine volute (3) to a wastegate duct (7) which discharges into the turbine housing outlet (4) downstream of the turbine wheel exhaust outlet; and
a slide sleeve (8) which is arranged between the bypass duct (6) and wastegate duct (7) and which can be moved via an actuating device (9) into an open position allowing flow of exhaust gas through the bypass duct (6) and wastegate duct (7) and a closed position blocking flow of exhaust gas through the bypass duct (6) and wategate duct (7), and which is arranged such that the exhaust gas flow is directed at the slide sleeve in a substantially non-axial direction.

5. The turbine as claimed in claim 4, wherein the bypass duct (6) opens out into an annular chamber (11) which is arranged upstream of the slide sleeve (8) as viewed in the flow direction of the exhaust gases, wherein the wastegate duct (7) is an annular wastegate duct which circumscribes the turbine wheel exhaust outlet, and wherein the annular chamber (11) empties into the annular wastegate duct (7).

6. The turbine as claimed in claim 4, wherein the slide sleeve (8) is guided, at its inner surface (12) which faces toward the turbine housing axis (L), by a sleeve bearing (13) which is fixed in the turbine housing (2).

7. The turbine as claimed in claim 4, wherein the slide sleeve (8) is guided, at its outer surface (14) facing away from the turbine housing axis (L), by a sleeve bearing (15) which is fixed in the turbine housing (2).

8. The turbine as claimed in claim 4, wherein the turbine housing has a wall (19), the sleeve bearing (15) extends into the region of the turbine housing wall (19) and is provided with at least one opening (16) in said region.

9. The turbine as claimed in claim 4, wherein the slide sleeve (8) is guided, in the closed position, as far as a point at which it abuts against a turbine housing wall (19).

10. The turbine as claimed in claim 4, wherein the wastegate duct (7) generates an axial flow component at the turbine outlet (4).

11. The turbine as claimed in claim 4, wherein the cross-sectional area of the wastegate duct (7) is dimensioned so as to create an ejector effect with high flow speeds.

12. The turbine as claimed in claim 4, wherein the slide sleeve is in the form of a cylinder having an axis, wherein the axis of the slide sleeve (8) is inclined in relation to the turbine housing axis (L).

13. The turbine as claimed in claim 4, wherein the actuating device (9) is an actuating fork.

14. The turbine as claimed in claim 4, wherein the actuating device (9) is a lever.

* * * * *